(No Model.)
J. PRESTON.
NUT LOCK.
No. 254,154.    Patented Feb. 28, 1882.
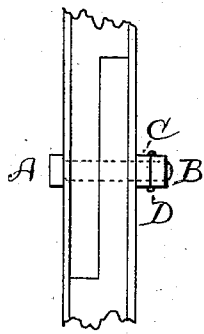
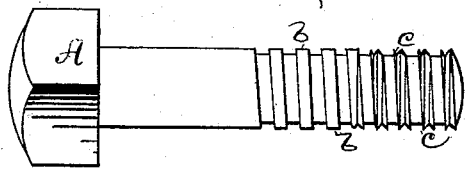
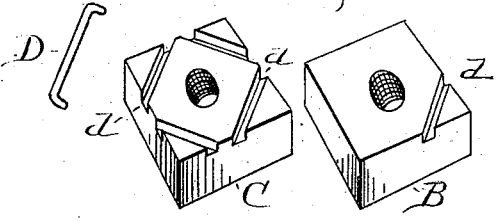
WITNESSES:
T. H. Parsons
J. R. Drake
Joseph Preston,
INVENTOR
BY J. R. Drake
ATTORNEY.

UNITED STATES PATENT OFFICE.

JOSEPH PRESTON, OF ROCHESTER, ASSIGNOR OF ONE-HALF TO MARGARET E. PRESTON, OF BUFFALO, NEW YORK.

NUT-LOCK.

SPECIFICATION forming part of Letters Patent No. 254,154, dated February 28, 1882.

Application filed October 6, 1881. (No model.)

*To all whom it may concern:*

Be it known that I, JOSEPH PRESTON, a citizen of the United States, residing at Rochester, in the county of Monroe and State of New York, have made certain Improvements in Bolts and Nut-Locks, of which the following is a specification.

This invention relates to screw bolts and nuts used for fastening fish-plates or any wood and iron pieces together; also, to locking on the nuts to prevent their loosening or coming off, unless desired; and the invention consists in making two different screw-threads on the bolt—one a right-hand thread running as usual, the other a left-hand thread running across or contrawise to and on the other, but only a short distance, and cut across the first.

It further consists in employing in connection with this bolt two nuts—first, the usual nut which goes on, having the usual corresponding thread to the first on the bolt; second, a nut having a corresponding thread to the second or left-hand thread thereon; and, finally, in making in the sides of the nuts that face each other grooves which, when the nuts come together, make a square or round path or hole, in which is inserted a pin of wire and the ends bent down, preventing the nuts from moving, all as hereinafter fully explained.

In the drawings, Figure 1 is a plan of two pieces of railroad-iron fastened together by my bolt and two nuts, &c.; Fig. 2, a perspective of the bolt, showing the two different threads; Fig. 3, perspectives of the two nuts, showing the pin-grooves therein, also the pin bent and separate therefrom.

A represents a bolt having cut thereon both a right-hand screw-thread, *b*, and a left-hand screw-thread, *c*, the latter running but a short distance, sufficient to receive a nut, B, with a corresponding thread tapped therein. The first nut, C, is tapped in the usual manner to go on the bolt first and tighten against the wood or iron, as shown in Fig. 1. After this the second nut, B, is screwed on. In this arrangement it is impossible for the first nut, C, to move, as any back-turning only tightens it against the second nut, B. To prevent this nut B from loosening, I form grooves *d d* in the inside faces of each nut, running diagonally or across the corners of each, as shown in Fig. 3, and these grooves come together when the nuts are screwed tight on the bolt, making a continuous opening or path through the nuts, in which a wire pin or nail is inserted, and the end or ends bent down, as shown. If a nail is used, the head answers for one end. In this position the nuts are both locked securely, so that it is impossible to loosen them until the nail or wire is driven out.

This bolt with a right and left hand thread thereon, and with two nuts fitting on it, each tapped to fit independently the different threads, I believe to be new.

It is old, as I am aware, to put two nuts on the same bolt or screw with the same thread, and to lock them on, but not like mine.

I claim—

The combination and arrangement of the bolt A, with the right and left hand threads thereon, and the nuts B and C, having the diagonal grooves *d d* in the sides for the key-pin D to set in, all substantially as and for the purpose specified.

In witness whereof I have hereunto signed my name in the presence of two subscribing witnesses.

JOSEPH PRESTON.

Witnesses:
J. R. DRAKE,
MARGARET PRESTON.